United States Patent [19]
Nowicki

[11] Patent Number: 5,829,923
[45] Date of Patent: Nov. 3, 1998

[54] BLADE-TYPE HOLDER FOR CLAMPING A CUTTING INSERT AND AN ADAPTER FOR SUPPORTING THE HOLDER

[75] Inventor: Brian Nowicki, West Milford, N.J.

[73] Assignee: Sandvik, Inc., Fairlawn, N.J.

[21] Appl. No.: 741,361

[22] Filed: Oct. 30, 1996

[51] Int. Cl.⁶ .................................................. B23B 27/08
[52] U.S. Cl. ............................ 407/91; 407/101; 407/109
[58] Field of Search .................................... 407/101, 102, 407/106, 107, 50; 47/110, 91, 33, 40, 41, 46; 82/158, 161

[56] References Cited

U.S. PATENT DOCUMENTS

| | | | |
|---|---|---|---|
| 302,496 | 7/1884 | Johnson | 407/91 |
| 312,034 | 2/1885 | Steele | 407/91 X |
| 1,814,882 | 7/1931 | Zinslen | 407/91 X |
| 1,835,992 | 12/1931 | Severson | 407/91 |
| 3,505,715 | 4/1970 | Germani | 407/101 X |

*Primary Examiner*—A. L. Pitts
*Assistant Examiner*—Henry W. H. Tsai
*Attorney, Agent, or Firm*—Burns, Doane, Swecker & Mathis, L.L.P.

[57] ABSTRACT

A blade-type cutting insert holder is connected to an adapter. The blade includes a pair of clamp arms forming a space therebetween in which a cutting insert is clamped. The adapter includes a slot in which the blade is mounted. A clamp screw is threadedly mounted in the adapter and is arranged to engage one of the clamp arms and press it toward the other clamp arm to create an insert-retaining clamp force.

2 Claims, 1 Drawing Sheet

BLADE-TYPE HOLDER FOR CLAMPING A CUTTING INSERT AND AN ADAPTER FOR SUPPORTING THE HOLDER

BACKGROUND OF THE INVENTION

The present invention relates to metal cutting tools and, in particular, to a parting tool and an adapter for mounting the parting tool to a carrier.

A parting tool typically comprises a cutting insert mounted in an insert holder, commonly referred to as a blade, due to its narrow configuration. Such a blade is disclosed, for example, in U.S. Pat. No. 5,288,180. The blade includes a pair of narrow upper and lower clamp arms between which the cutting insert is clamped. The clamping force is provided by a clamp screw which passes through the upper clamp arm and is threadedly secured to the lower clamp arm. While such a tool holder generally tends to function acceptably, the amount of clamping force that can be applied is considerably restricted, because the narrowness of the clamp arms requires that the clamp screw be of relatively small diameter. The small diameter means that the screw threads are of relatively short diameter, thereby limiting the amount of axial clamping force that can be generated.

Parting tools are used in automated machine tools, in which the blade is mounted by means of an adapter, the blade being secured to the adapter by bolts.

SUMMARY OF THE INVENTION

The present invention relates to the combination of a blade adapted to carry a cutting insert, and an adapter carrying the blade. The blade includes first and second opposing clamp arms forming an opening therebetween adapted to receive the cutting insert. The adapter includes a slot in which the blade is mounted. The slot is formed between opposing sections of the adapter. One of the sections is wider than at least the first clamp arm and includes a threaded hole communicating with the slot. A clamp screw is threadedly mounted in the hole such that an end of the clamp screw is engageable with the first clamp arm in response to the clamp screw being screwed-down, to press the first clamp arm toward the second clamp arm.

Preferably, the clamp screw includes a shank portion threadedly mounted in the hole and having a diameter at least as large as, and more preferably larger than, a width of the first clamp arm.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
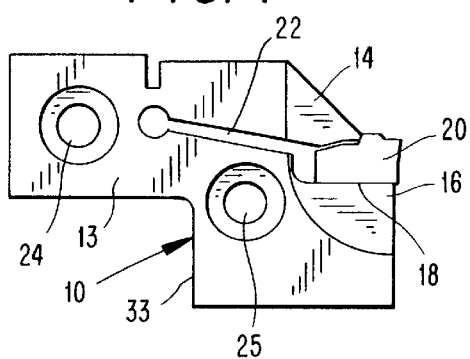
FIG. 1 is a side elevational view of a blade according to the invention, with a cutting insert disposed therein.
Figure 5:
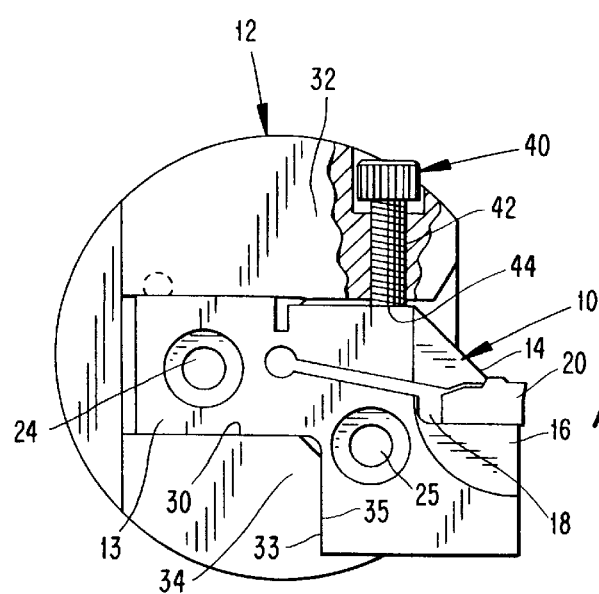
FIG. 5 is a side elevational view of the adapter, showing the blade mounted therein, and with the insert clamped within the blade, and with a portion of the adapter broken away.

Depicted in FIG. 5 is a blade type of insert holder 10 secured to an adapter 12 according to the present invention. The blade, also shown in FIG. 1, includes a base 13 from which upper and lower clamp arms 14, 16 extend. Formed between the clamp arms 14, 16 is an opening 18 for receiving a conventional replaceable cutting insert 20. A groove 22 extends rearwardly from the opening 18 to increase the flexibility of the upper clamp arm 14. The blade is secured to the adapter 12 by bolts (not shown) which pass through holes 24, 25 formed in the base 13 of the blade, and through holes 26, 27 formed in the adapter in alignment with the holes 24, 25, respectively.

Figure 2:
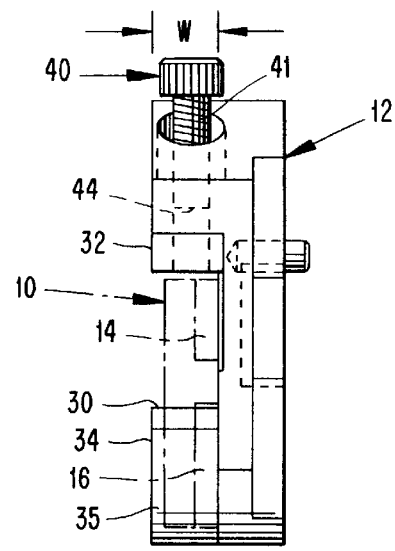
FIG. 2 is a front elevational view of an adapter according to the present invention, with the blade depicted therein in phantom lines.
Figure 4:
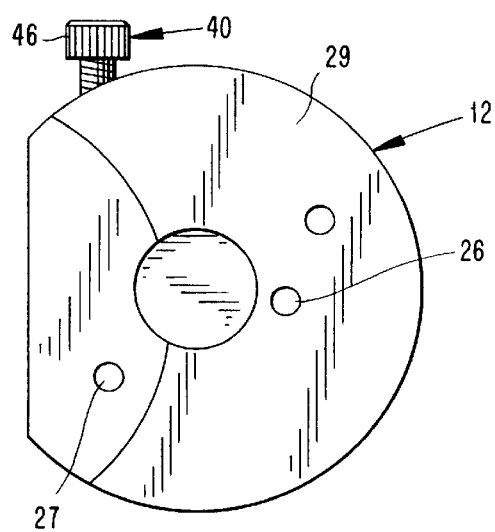
FIG. 4 is an elevational view of the other side of the adapter depicted in FIG. 2.
Figure 3:
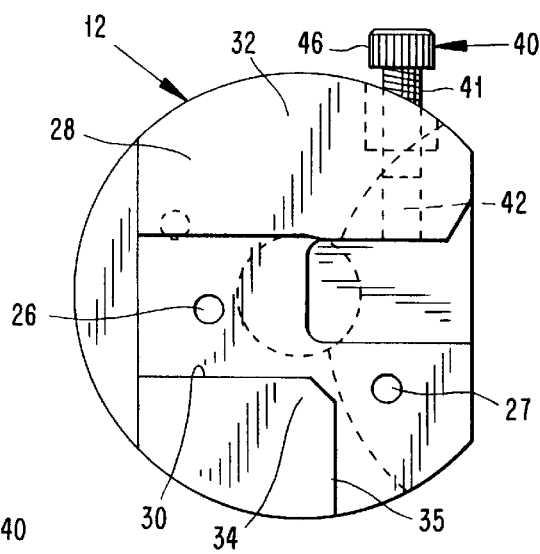
FIG. 3 is an elevational view of one side of the adapter depicted in FIG. 2.

The adapter 12 includes first and second opposite sides 28, 29 and a slot 30 in which the blade 10 is disposed. The slot 30 extends into the first side 28 and terminates short of the second side 29 so as to be open in a direction facing away from the side 29. The slot 30 is formed between upper and lower sections 32, 34 of the adapter. The blade 10 includes a surface 33 which abuts against a wall 35 of the adapter. The blade 10 is shown in phantom lines in FIG. 2 as disposed within the slot 30. It will be appreciated from FIG. 2 that the upper section 32 of the adapter 12 has a width W which is substantially larger than a width of the clamping arms 14, 16 of the blade.

The adapter is to be mounted to a carrier such as a turret (not shown) on an automatic machine in any conventional manner.

When the blade 10 is mounted in the adapter 12, front ends of the clamp arms 14, 16 project from an open front end of the slot 30 (see FIG. 5).

As explained earlier, the clamp arms of a conventional blade are typically squeezed together by a clamp screw passing through the upper clamp arm and threadedly mounted in the lower clamp arm.

However, in accordance with the present invention, the upper clamp arm 14 is pressed toward the lower clamp arm 16 by a clamp screw 40 that is mounted in the adapter 12. In that regard, the upper section 32 of the adapter includes a threaded hole 42 which communicates with the slot 30 and extends parallel to the sides 28, 29 The clamp screw 40 is threadedly mounted in that hole so that an end 44 of a shank 41 the clamp screw can bear against the upper clamp arm 14. By rotating a knurled head 46 of the clamp screw 40, the clamp screw can be advanced against the upper clamp arm 14 to press that upper clamp arm against the cutting insert 20 disposed within the opening 18 formed between the clamp arms.

It will be appreciated that due to the relatively large width W of the upper section 32 of the adapter 12, the diameter of the screw thread of the clamp screw 40 can be made relatively large, thereby enabling a greater pressing force to be generated. In fact, in the disclosed preferred embodiment, the diameter of the shank portion of the screw 40 is larger than the width of the front end of the upper clamp arm 14.

Furthermore, since the screw 40 is mounted in the adapter 12 rather than in the blade 10, the knurled head 46 of the screw is more accessible for manual actuation.

Accordingly, the present invention enables a relatively large clamping force to be produced for clamping a parting insert within a blade, and such force is produced by a readily accessible clamp screw.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. In combination, a blade adapted to carry a cutting insert, and an adapter carrying the blade; the blade including a base and first and second opposing clamp arms of one-piece construction with the base; the base including a rear end and a front end; the clamp arms projecting forwardly from the base and forming a forwardly open opening therebetween adapted to receive the cutting insert; the adapter including first and second opposite sides defining therebetween a thickness of the adapter, and a slot in which the blade is mounted; the slot extending into the first side and terminating short of the second side, whereby the slot is open in a direction facing away from the second side, the slot including an open front end from which front ends of the first and second clamp arms project; the slot formed between opposing sections of the adapter; one of the sections being immovable relative to the rest of the adapter and being wider than at least the first clamp arm and including a threaded hole communicating with the slot and extending substantially parallel to the first and second sides; at least one fastener fixing the base to the adapter and preventing relative movement of the base relative to the adapter; a clamp screw threadedly mounted in the hole such that an end of the clamp screw is engageable with the first clamp arm in response to the clamp screw being screwed-down, to press the first clamp arm toward the second clamp arm; the clamp screw including a shank portion threadedly mounted in the hole and having a diameter at least as large as a width of a front end of the first clamp arm.

2. The combination according to claim 1, wherein the diameter is larger than the width of the front end of the first clamp arm.

\* \* \* \* \*